May 13, 1958   S. J. SAGE   2,834,254
ELECTRONIC COLOR FILTER
Filed Oct. 22, 1953   3 Sheets-Sheet 1

INVENTOR
STANLEY J. SAGE
BY
Darby & Darby
ATTORNEYS

May 13, 1958　　　　S. J. SAGE　　　　2,834,254
ELECTRONIC COLOR FILTER

Filed Oct. 22, 1953　　　　　　　　　　　　　　3 Sheets-Sheet 3

INVENTOR
STANLEY J. SAGE
BY
Darby & Darby
ATTORNEYS

15 # United States Patent Office 2,834,254
Patented May 13, 1958

2,834,254

ELECTRONIC COLOR FILTER

Stanley J. Sage, Brookline, Mass., assignor to Allen B. Du Mont Laboratories, Inc., Clifton, N. J., a corporation of Delaware Application October 22, 1953, Serial No. 387,729

2 Claims. (Cl. 88—106)

This invention relates to electro-optic devices for controlling the transmission of light. It relates particularly to electro-optic devices as used to control the color characteristics of light transmission filters for color television and similar apparatus.

One of the best-known types of electro-optic devices is a Z-cut plate of P-type crystalline material, such as ammonium dihydrogen phosphate. Such plates have the property of effectively rotating by 90° the plane of polarization of linearly polarized light transmitted along the Z, or optic axis thereof when a voltage gradient is established in the plate parallel to the optic axis. Color filters making use of this property have been proposed in the past, but it has been found that P-type crystal plates tend to fracture under high D. C. potentials such as have previously been encountered in the operation of these plates in color television filters.

The primary object of the invention is to improve the operation of electro-optic devices subjected to asymmetrical alternating voltages.

P-type plates are cut from crystals which are normally uniaxial but which become biaxial when subjected to Z-axis voltage gradients. When a beam of light is directed along the Z-axis of voltage-energized P-type plates, the light splits into two plane-polarized, mutually perpendicular components, one of which is propagated through the plate with a greater velocity than the other. Such a plate is called a retardation plate because it retards one component. If the incident light is polarized in a plane at 45° an angle with respect to the two mutually perpendicular planes, the voltage, if less than about 9500 v., affects the plate in such a way as to transform the emerging beam into elliptically or circularly polarized light. If a voltage of about 9500 v. is applied to the plate, the emerging beam is again plane polarized, but in a plane making an angle of 90° with the plane of polarization of the incident light.

The crystal energizing potential, which normally has a large D. C. component, may be biased or transmitted through a blocking condenser to shift the D. C. axis of the voltage so as to reduce the D. C. component to zero. However, if this is done, the mode of operation of the crystal will shift from its desired characteristic of producing a plane polarized emerging beam in response to a plane polarized incident beam. Instead, the emerging beam will be elliptically polarized.

According to the present invention, a fixed retardation plate, such as a sheet of mica, may be inserted as an optical bias plate to cancel the undesired ellipticity of polarization of the emerging beam during certain portions of the operating cycle. Thus, the optical bias plate counteracts the effect of shift of D. C. electrical bias and makes it possible to use a P-type crystal plate under strictly A. C. voltage excitation but giving the desired overall optical results formerly obtained only by utilizing A. C. plus a D. C. component in the energizing voltage.

Other objects are to provide an electronic filter incorporating electro-optic devices, such as P-type crystals, combined with optical bias elements to eliminate the necessity of applying a D. C. potential to the crystals, and to provide such an arrangement particularly adapted for use with three color television systems.

Further objects will be apparent after studying the following specification, together with the drawings in which.

Figure 1:
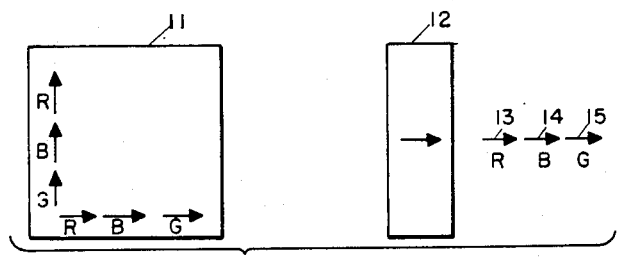
Fig. 1 is a symbolic diagrammatic representation of a light source and a linear polarizer.

A beam of randomly polarized white light may be arbitrarily represented by a system of two mutually perpendicular vectors, each having three primary color component vectors red, green and blue. In Fig. 1 such a light source is represented by the reference character 11. When a linear polarizer 12 with its absorbing axis vertical is placed in front of a light source 11, only the horizontally polarized vectors can pass therethrough, as indicated by the vectors 13—15.

Figure 2:
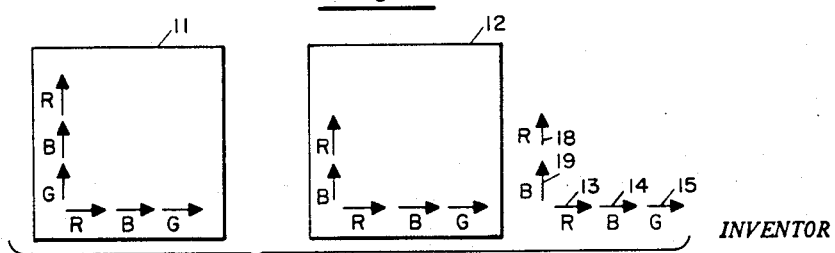
Fig. 2 is a symbolic diagrammatic representation of a light source and a dichroic polarizer.

However, when white light passes through a dichroic polarizer of the kind which may be called minus green, the emergent light, as is shown in Fig. 2, comprises not only all three of the horizontal vectors 13—15, but also the vertically polarized red and blue component vectors 18 and 19. Dichroic polarizer 17 may also be called a 3-2 polarizer since it passes three primary color components in one plane of polarization and two in the perpendicular plane. Similarly, there are 2-2 dichroic polarizers which pass two primary color components in each of the two mutually perpendicular planes of polarization and 2-1 dichroic polarizers which pass two components in one plane of polarization and only one component in the perpendicular plane.

Figure 3:
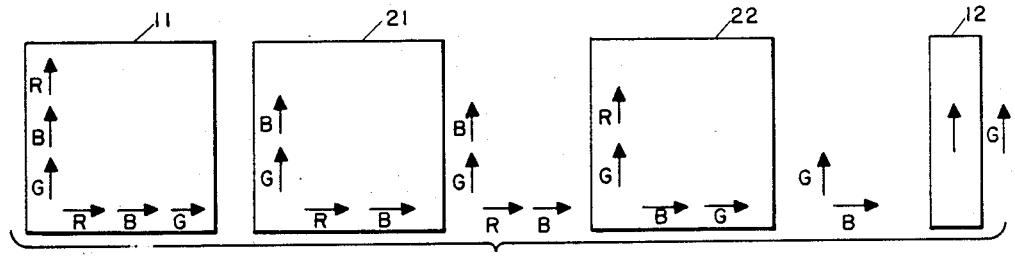
Figs. 3–5 show diagrammatically various arrangements of dichroic polarizers to produce the three primary color components of white light.
Figure 4:
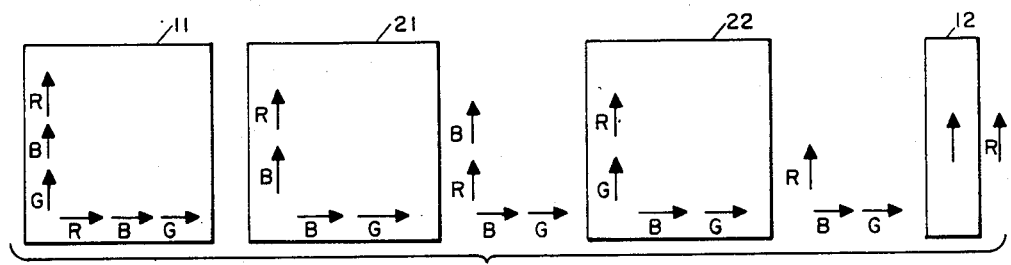
Figure 5:
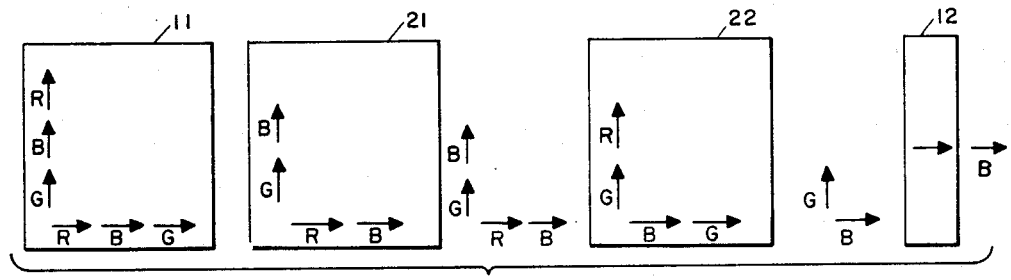

By using only two of the 2-2 or 2-1 dichroic polarizers and one linear polarizer it is possible to transmit any one primary color component red, blue or green. Such an arrangement is shown in Figs. 3–5. In Fig. 3, the first dichroic polarizer 21, which may be termed a cyanmagenta (or a minus red-minus green) polarizer and a yellow-cyan polarizer 22 are combined with a linear polarizer 12 and are aligned so that only one primary color component passes through the entire combination. As is evident from the vectors shown, the first dichroic polarizer 21 eliminates the red primary color component from the vertical plane of polarization and the green primary color component from the horizontal plane of polarization. The second dichroic polarizer 22 further eliminates the blue vertically polarized color component and the red horizontally polarized color component, leaving only the green vertically polarized color component and the blue horizontally polarized color component. The linear polarizer 12 further eliminates the blue horizontally polarized color component so that only the green vertically polarized color component is transmitted through the entire system. It should be noted that the three polarizers may be permuted in any order from left to right so long as they are not rotated, and the emergent light will still be green and will be vertically polarized.

If the first dichroic polarizer 21 is rotated 90° to the position shown in Fig. 4, the emergent light will be red, only, and will be vertically polarized. If the first dichroic polarizers 21 and 22 are maintained in the same orientation as shown in Fig. 3, but the linear polarizer 12 is rotated 90°, as is shown in Fig. 5, the emergent light will be blue, only, and will be horizontally polarized.

By this arrangement of dichroic polarizers it is possible to obtain an optical arrangement which will separate in turn each of the three primary color components of white light. It should be noted that this is only possible if 2-2 or 2-1 dichroic polarizers are used and if each dichroic polarizer passes at least two of the primary color components in one plane of polarization and at least the third primary color component in the perpendicular plane of polarization and, furthermore, if the two dichroic polarizers are not identical. If 3-1 or 3-2 dichroic polarizers are used, it will be necessary to employ three of them to obtain independent separation of the three primary color components.

In color television of sequential type it is necessary to operate the color filter so that one primary color component is passed for a fairly short interval of time and then a second primary color component is passed and then the third. These intervals are so short that it is impractical to rotate dichroic polarizers or move them mechanically fast enough to obtain the desired color separation. Instead, an electro-optic element is utilized which has the property of effectively rotating the plane of polarization of linearly polarized light by 90° when subjected to a suitable electric field.

This new element consists of a crystal plate laminated between transparent conducting electrodes. The crystalline material of which the plate is formed may be a "P" type crystal, such as ammonium dihydrogen phosphate. When a voltage of about 9500 volts is applied between the two electrodes making contact with a Z-cut plate of such crystalline material, the plane of polarization of linearly polarized light incident along the optic axis of the crystal plate is rotated by about 90°. The voltage gradient is set up along the optic axis of the crystal in the same direction as that in which light passes through the unit so that the rotational effect is independent of the thickness of the crystal plate and either a thick or thin crystal plate may be used.

Figure 6:
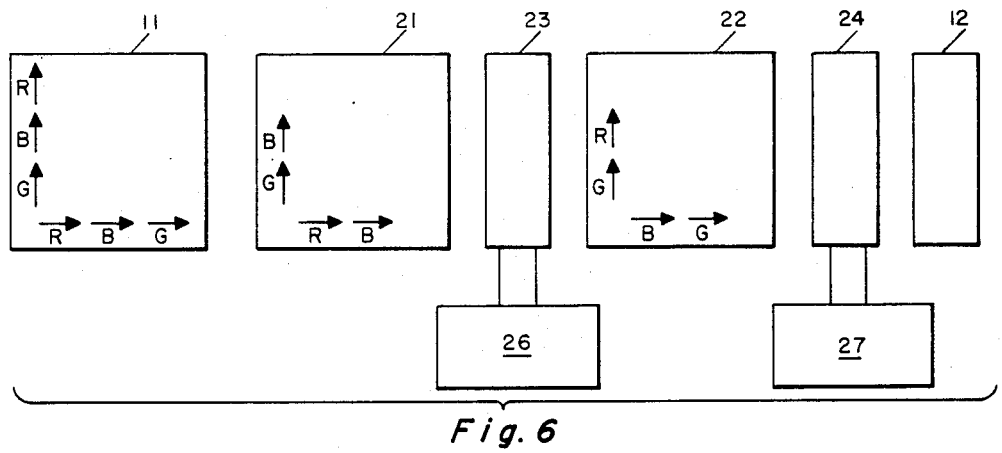
Fig. 6 shows diagrammatically a simple electronic color filter.

Fig. 6 shows an electronically operated color filter comprising electro-optic devices 23 and 24 together with the dichroic polarizers 21 and 22 and the linear polarizer 12 of Figs. 3–5. Voltage sources 26 and 27 are connected to the electro-optic devices 23 and 24, respectively. When the voltage output of sources 26 and 27 is zero, the only light which can pass completely through the optical arrangement is green vertically polarized as in Fig. 3. However, if the electro-optic device 23 is energized by a voltage of approximately 9500 volts from source 26, the plane of polarization of light passing therethrough is rotated by about 90° and only red light can pass completely through the entire color filter as in the equivalent arrangement of Fig. 4. Alternatively, if electro-optic device 23 is not energized by its power supply 26 but electro-optic device 24 is energized by source 27, only blue light passes through the entire filter. This is equivalent to the arrangement in Fig. 5.

Figure 7:
Figs. 7–9 show electrical wave forms obtained in the operation of the filter of Fig. 6.
Figure 8:
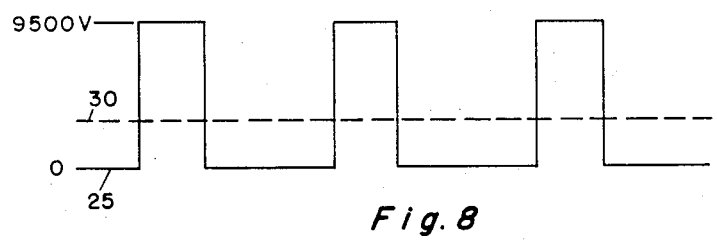

Fig. 7 represents a synchronizing voltage to control the operation of sources 26 and 27. The separate intervals 28—30 correspond to intervals when green, red, and blue light, respectively, pass through the filter of Fig. 6. Fig. 8 represents the voltage output of source 26 as controlled by the voltage wave of Fig. 7, and Fig. 9 represents the voltage output of source 27 as controlled by the synchronizing wave of Fig. 7.

Figure 9:
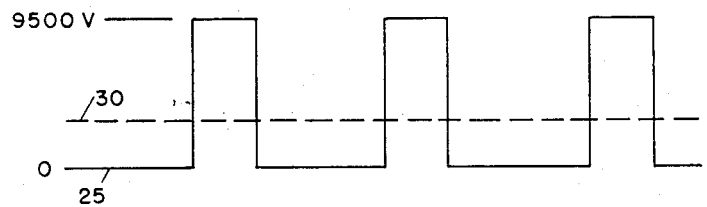

Both of the voltage waves in Figs. 8 and 9 are pulse waves having a duty cycle of ⅓. The term "duty cycle" refers to a dimensionless factor R which is the ratio of the duration of each pulse to the length of time between corresponding points of successive pulses. The average D. C. component of such waves with the zero voltage axis 25 is ⅓ of the peak amplitude, which means that the average D. C. component of the particular waves of Figs. 8 and 9 is approximately 3166 volts and is indicated by the dotted line 30. Even this average voltage is high enough to fracture the P-type crystals used as electro-optic devices 23 and 24. It is therefore necessary to provide an energizing voltage for these crystals which is substantially purely alternating current in character, i. e. substantially free from any D. C. component.

Figure 10:
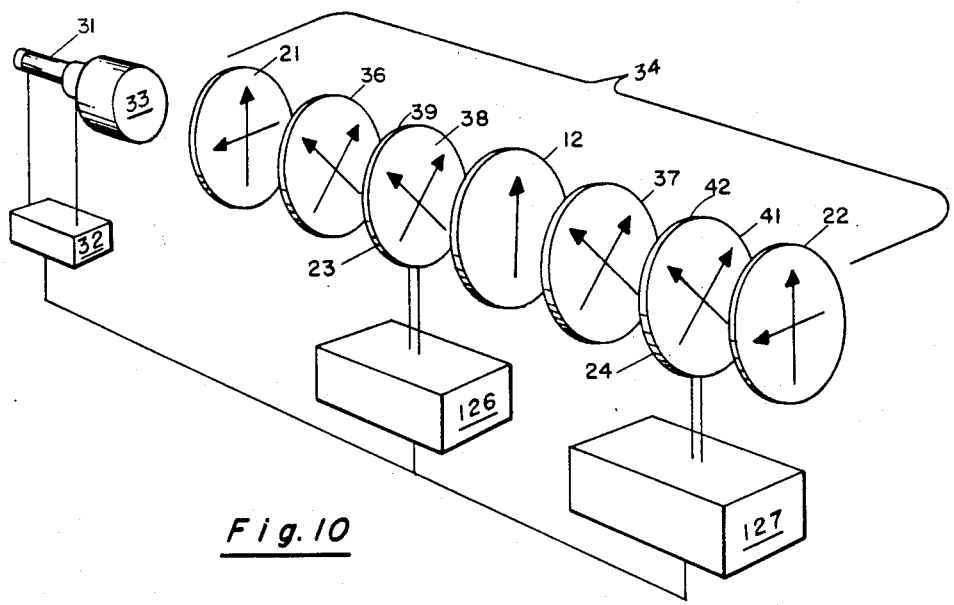
Fig. 10 is an exploded view in perspective of a television viewing device comprising one embodiment of the invention.

Fig. 10 shows an electronically operated filter similar to the filter in Fig. 6, except that optical biasing elements are included according to the invention so that the zero voltage axis of the energizing voltage waves in Figs. 8 and 9 may be shifted to the level indicated by dotted line 30 to eliminate the average D. C. component. In Fig. 10, a cathode-ray tube 31 is energized by a source 32 of operating potentials in the usual way to produce a pattern of light or raster on the fluorescent screen 33.

An electronic filter 34 is mounted in front of the screen 33 to filter light therefrom so as to produce a color television image. Filter 34 comprises in order, a first dichroic polarizer 21, an optical bias plate or element 36, a first P-type crystal electro-optic device 23, a linear polarizer 12, a second optical bias plate 37, a second P-type crystal plate 24 and a second dichroic polarizer 22. It will be noted that filter 14 contains all of the elements of the filter in Fig. 6 but permuted into a different order. This permutation in no way affects the essential operation of the filter. The front and back surfaces of the first P-type crystal plate 23 are laminated with transparent electrodes 38 and 39 to which the terminals of the power supply 126 are connected, and a similar power supply 127 is connected to electrodes 41 and 42 laminated to the front and back surfaces, respectively, of the second P-type crystal plate 24.

As in Fig. 6, the power supplies 126 and 127 are synchronized by the voltage wave of Fig. 7, as supplied by the source 32, and are identical in operation to the power supplies 26 and 27 of Fig. 6, except that the output voltage is shifted as by a D. C. bias so that the zero axis falls along the dotted line 30 in Figs. 8 and 9. The output voltage of supplies 126 and 127, therefore, varies between $-3166$ volts and $+6333$ volts.

This voltage wave, having no D. C. component, does not tend to fracture the P-type crystals 23 and 24. However, it results in a type of operation which is not commensurate with the color separating characteristics of the filter 14. During the period of time 28, as indicated in Fig. 7, it is desired that zero energizing voltage be applied to crystal 23. By virtue of the D. C. bias just described, the output voltage of source 126 during this same period of time is not zero but instead is $-3166$ volts. As a result, the crystal 23 does not act as a zero retardation plate but instead acts as a retardation plate of about one-sixth of a wave length, or $\lambda/6$. Because of the fact that the energizing voltage is negative during the period of time 28, it might be considered that the crystal 23 acts as an advancement plate of $\lambda/6$. Furthermore, during the period of time 29, it is desired that the crystal 23 act as a half-wave, or $\lambda/2$, retardation plate, but during this period of time the output voltage of source 126 is only two-thirds of the value required to transform crystal 23 into a half-wave retardation plate. Therefore, the crystal will correspond more closely to a $\lambda/3$ retardation plate.

The compensating optical biasing element 36 is incorporated in the filter 14 to supply an extra retardation of $\lambda/6$ according to the invention. The $\lambda/6$ retardation supplied by optical biasing element 36 cancels the $\lambda/6$ advancement of crystal 23 during the period of time 28 and adds to the $\lambda/3$ retardation of crystal 23 during the period of time 29 to produce the desired $\lambda/2$ retardation required in that period. In this manner, the undesirable D. C. component may be obviated without at the same time incurring an undesired shift of the optical operating characteristics of the P-type electro-optic devices 23 and 24.

Although this invention has been described in terms of a single embodiment, it will be obvious to those skilled in the art that modifications may be made therein within the scope, as defined in the following claims.

What is claimed is:

1. An electronic color filter comprising in order along an optical path, a first dichroic polarizer passing first and second primary color components in a first plane of polarization and a third primary color component in a perpendicular plane; a first optically active element comprising a first optical bias plate having a retardation of approximately one-sixth of a wavelength of green light and a first electro-optic retardation plate having an optic axis, said electro-optic retardation plate having a pair of substantially transparent electrodes thereon; a substantially pure alternating current pulse source connected to said electrodes to establish an electric field substantially parallel to the optic axis thereof, the pulses of said source having a duty cycle of substantially ⅓; a linear polarizer aligned substantially parallel to one of said planes of polarization; a second optically active element comprising a second optical bias plate having a retardation of approximately one-sixth of a wavelength of green light and a second electro-optic retardation plate having an optic axis, said electro-optic retardation plate having a pair of substantially transparent electrodes thereon; a second substantially pure alternating current pulse source connected to said last named electrodes to establish an electric field substantially perpendicular to said optic axis thereof, the pulses of said second source having a duty cycle of substantially ⅓; and a second dichroic polarizer passing said first and third primary color components in one said plane of polarization and said second primary color component in the other said plane.

2. An electronic color filter comprising in order along an optical path, a first 2-1 dichroic polarizer passing first and second primary color components in a first plane of polarization and a third primary color component in a perpendicular plane; a first optically active element comprising a first optical bias plate having a retardation of approximately one-sixth of a wavelength of green light and a first Z-cut plate of P-type crystalline material, said Z-cut plate having a pair of substantially transparent electrodes thereon; a first source of voltage pulses having a substantially pure alternating current character and having a duty cycle of substantially ⅓, said source being connected to said electrodes to establish an electric field substantially parallel to the Z axis of said Z-cut plate; a linear polarizer aligned substantially parallel to one of said planes of polarization; a second optically active element comprising a second optical bias plate having a retardation of approximately one-sixth of a wavelength of green light and a second Z-cut plate of P-type crystalline material, said second Z-cut plate having a pair of substantially transparent electrodes thereon; a second source of voltage pulses having a substantially pure alternating current character having a duty cycle of substantially ⅓, said second source being connected to said last named electrodes to establish an electric field substantially perpendicular to the Z axis of said Z-cut plate; and a second 2-1 dichroic polarizer passing said first and third primary color components in one said plane of polarization and said second primary color component in the other said plane.

References Cited in the file of this patent

UNITED STATES PATENTS

| | | |
|---|---|---|
| 2,493,200 | Land | Jan. 3, 1950 |
| 2,586,635 | Fernsler | Feb. 19, 1952 |
| 2,715,153 | Sziklai | Aug. 9, 1955 |

OTHER REFERENCES

"Electrical color filters," article by Babits and Hicks, in "Electronics," vol. 23, No. 11, November 1950, pages 112—115 cited.